United States Patent [19]
Ogiso et al.

[11] 3,882,516
[45] May 6, 1975

[54] AUTOMATIC WIND-UP DEVICE TO DETECT COMPLETION OF FILM WIND-UP

[75] Inventors: Mitsutoshi Ogiso, Kawasaki; Hiroshi Aizawa, Machida; Tomonori Iwashita, Tokyo, all of Japan

[73] Assignee: Canon Kabushiki Kaisha, Tokyo, Japan

[22] Filed: Oct. 19, 1973

[21] Appl. No.: 407,874

[30] Foreign Application Priority Data
Oct. 24, 1972 Japan.................... 47-106570

[52] U.S. Cl.................... 354/173; 242/71
[51] Int. Cl.............................. G03b 1/12
[58] Field of Search ...... 242/71; 95/31 EL; 354/173

[56] References Cited
UNITED STATES PATENTS
3,590,710  7/1971  Sasaki .................... 95/31 E
3,656,420  4/1972  Aizawa .................... 95/31 EL
3,705,338  12/1972  Tsujimoto .................... 95/31 EL

*Primary Examiner*—Edward J. McCarthy
*Attorney, Agent, or Firm*—Toren, McGeady and Stanger

[57] ABSTRACT

An automatic wind-up device to detect completion of film wind-up of a camera, in which the transmission of driving force to a rotating member which contributes to the wind up of the film is prevented at a time of holding by variation of output of a speed detection means which is in corresponding relationship with the rotating speed of said rotating member. At the same time, the driving force is transmitted through buffer means which prevents giving the film excessive wind-up effect during the holding period until the completion of prevention of driving force transmission.

6 Claims, 4 Drawing Figures

AUTOMATIC WIND-UP DEVICE TO DETECT COMPLETION OF FILM WIND-UP

BACKGROUND OF THE INVENTION

1. Field of the Invention

The present invention relates to an improvement of an automatic wind-up device which detects completion of film wind-up in an automatic film wind-up device.

2. Description of the Prior Art

Heretofore there have been such type A and type B arrangements as mentioned below which have been used as an automatic wind-up device. That is, in the type A automatic wind-up device, a connection joint portion between a wind-up driving power source and a wind-up mechanism rotates as much of a prescribed angle as required for film wind-up and stops automatically. In the type B automatic wind-up device, the rotating torque of the wind-up mechanism, which increases as the rotation of the wind-up axle is stopped as the wind-up is completed, and the load current of a wind-up motor, etc., are detected.

In the former type A, the rotated angle of the connecting joint needs to be in complete accord with the wind-up completion position. Thus it has the shortcoming of causing insufficient wind-up and other troubles if there is deviation therebetween.

In the latter type B, as the rotating torque, load current value, etc., are increased by completion of wind-up, an abnormal state of the wind-up mechanism cannot be detected.

For example, when the output of the driving power source side is lowered and wind-up becomes impossible, the state cannot be detected and the load on the driving power source cannot be released. Also in a torque detection type, the device is apt to become long in a vertical direction.

The first object of the present invention is to eliminate the above-mentioned shortcomings by detecting rotation speed of the wind-up mechanism which is reduced as the rotation of the wind-up axle stops.

The second object of the present invention is to provide a device with a high degree of accuracy by shortening the time required for detection of rotating speed of the wind-up mechanism.

The third object of the present invention is to prevent the rotating speed detecting means of the wind-up mechanism from detecting both the wind-up starting and the wind-up completion.

The fourth object of the present invention is to detect only the completion of film wind-up by providing a detecting means which detects start-up of rotation of the wind-up axle.

DESCRIPTION OF THE PREFERRED EMBODIMENT

Figure 1:
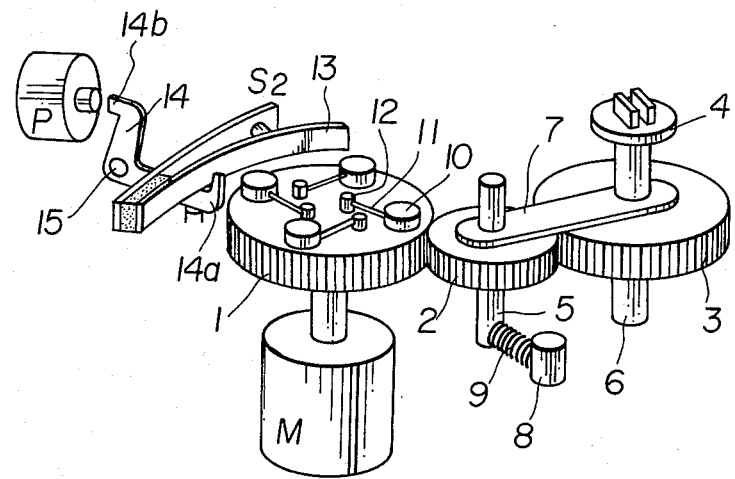
FIG. 1 is an oblique view to show important parts of the arrangement of the automatic wind-up device according to the present invention.
Figure 2:
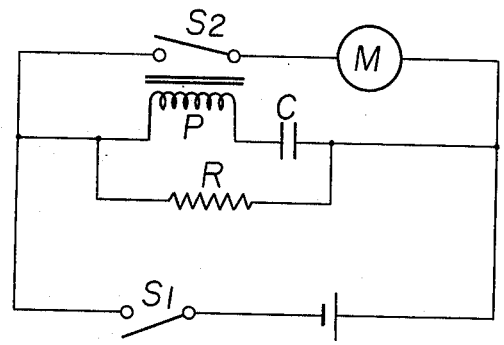
FIG. 2 is an electric circuit diagram which is applied to the device shown in FIG. 1.

Now explanation will be made of the examples shown in the drawings. FIG. 1 and FIG. 2 show the mechanism of the first example of the automatic wind-up device for film according to the present invention and a circuit diagram therefore. The gear 1 on the axle of a driving motor M engages with a wind-up last gear 3 through a gear 2. The last gear 3 is made integrally with a wind-up coupler 4 through an axle 6, which is installed to a main body (not shown in the drawing) in a rotatable manner. Also the above mentioned gear 2 engages with the gear 3 in a revolvable manner by a lever 7 which is installed in a rotatable manner to an axle 5 and an axle 6, and the axle 5 of the gear 2 is rotated by a pin 8 fixed to the main body and by a compression spring 9 in a clockwise direction, thereby the gear 2 engages with the gear 1.

A dead-weight 10 is rotatably installed on the gear 1 by a pin 12 through an arm 11. One end 14a of a lever 14 engages with a movable contacting piece 13 of a switch $S_2$ while its other end 14b faces an electromagnet P. The lever 14 is rotatably installed to the main body by a pin 15.

Next the functionings of the above mentioned members will be explained. When a switch $S_1$ in FIG. 2 is closed, a circuit of $S_1$, a capacitor C, and the electromagnet P is closed and the electro-magnet P which controls the starting of rotation of the wind-up axle becomes excited and attracts one end 14b of the lever 14. As the lever 14 rotates in a counter-clockwise direction, the movable contacting piece 13 of the switch $S_2$ is pushed to the left-hand side and $S_2$ closes. When the electro-magnet P becomes unexcited as the capacitor C is charged, and since the movable contacting piece 13 at this time is pushed to the left-hand side by the deadweight 10 which is pushed outwardly by centrifugal force by the rotation of the gear 1, the movable contacting piece 13 keeps its closed state. When wind-up of the film is completed and the load is given to the wind-up coupler 4 by which the rotating speed of the gear 1 is reduced, then the centrifugal force working on the deadweight 10 is reduced. Therefore the movable contacting piece 13 returns to the right-hand side, overcoming the centrifugal force of the deadweight 10. Therefore, $S_2$ becomes open and the rotation of the motor M is stopped. At this time when the load is given to the coupler 4 and the gear 3 stops, the gear 2 starts revolving in a counter-clockwise direction around the axle 6 against the compression spring 9. Therefore, the energy provided by the motor M, after load is given to the wind-up coupler 4 until the motor M stops, is consumed by the revolution of the gear 2 thus preventing excessive energy from being supplied to the wind-up coupler. The electric charge charged at the capacitor C is discharged by the circuit of C, resistance R, electro-magnet P by placing the $S_1$ in open state. The automatic wind-up of the film will be completed by the above function.

Figure 3:
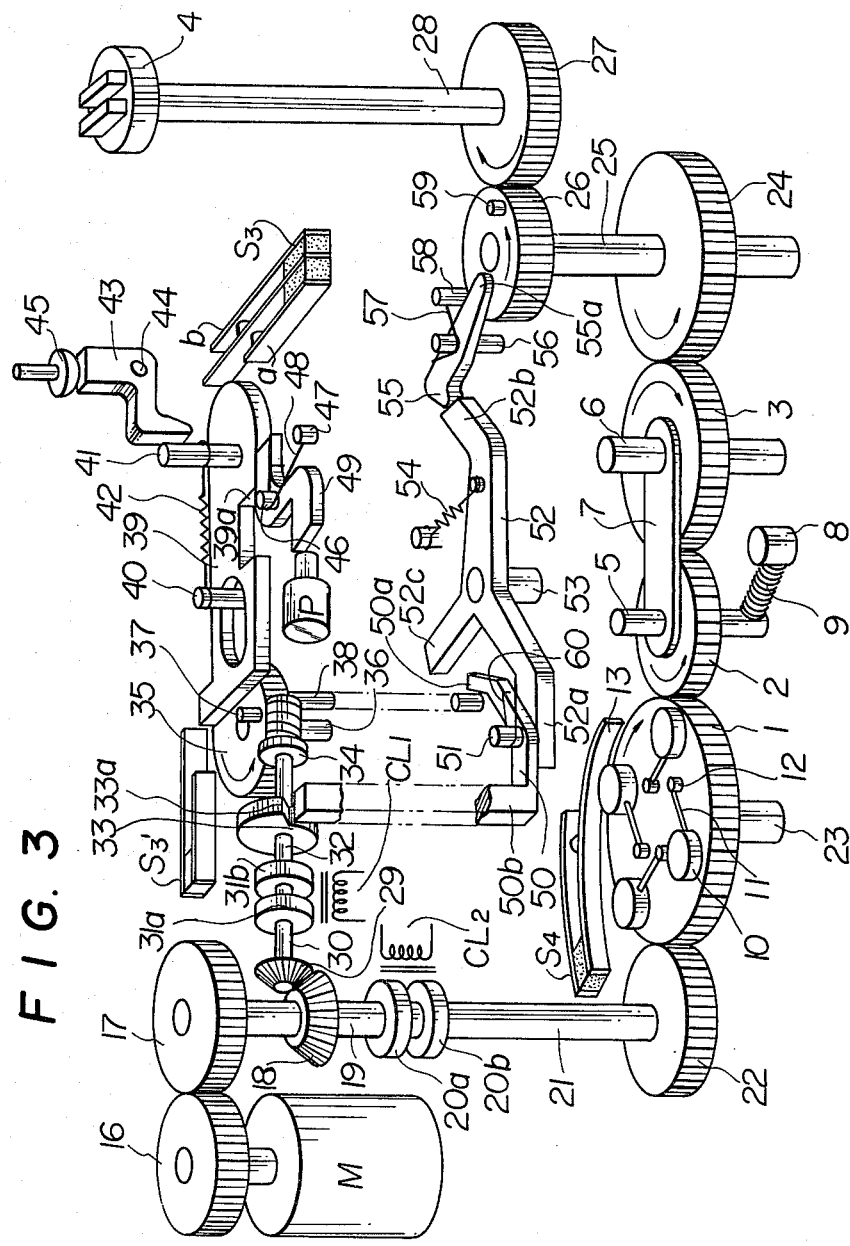
FIG. 3 is an arrangement drawing for the case wherein the device shown in FIG. 1 is applied to an automatic wind-up device of a camera.
Figure 4:
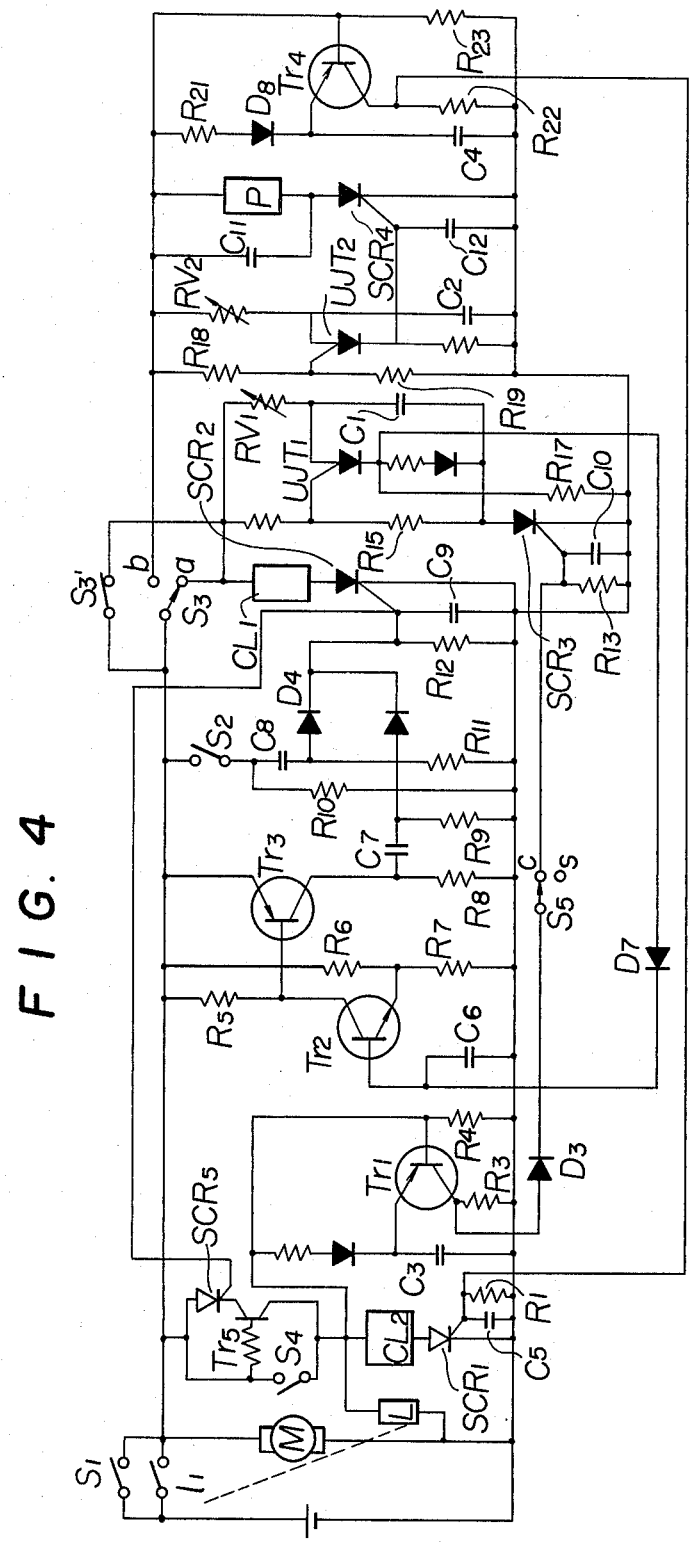
FIG. 4 is an electric circuit diagram applied to the device shown in FIG. 3.

FIG. 3 and FIG. 4 are a mechanism drawing and circuit diagram of the second example wherein the above mentioned device is developed and is built into an electric driving device of a camera.

First an explanation will be made of the mechanism parts. A gear 17 engages with a gear 16 on an axle of the driving motor M. A bevel gear 18 and an electromagnetic clutch plate 10a are made integral with the gear 17 by an axle 19, which is rotatably installed in to the main body (not shown in the drawing). An electromagnetic clutch plate 20b which faces the electromagnetic clutch plate 20a is made integral with, in turn a gear 22 by an axle 21, which is rotatably installed to the main body (not shown in the drawing). The gear 22 engages with the gear 1 which is integral with an axle 23, and the gear 2 engages with the gear 3 which is integral with an axle 6. The gear 3 engages with a gear 24 which is integral with a gear 26 by an axle 25, and the gear 26 engages with the gear 27 which is integral with a wind-up coupler 4 by an axle 28. The axles 23, 6, 25, 28 are all rotatably installed to the main body (not shown in the drawing). The above mentioned gear 2 engages in a revolvable manner with the gear 3 by a lever 7 which is rotatably attached to the axles 5 and 6. As the axle of the gear 2 is rotated in counter-clockwise direction by the pin 8 which is fixed to the main body (not shown in the drawing), and the compression spring 9, the gear 2 engages with the gear 1. The deadweight 10 is rotatably installed on the gear 1 by a pin 12 through an arm 11. A bevel gear 29 is made integral with an electro-magnetic clutch plate 31a by an axle 30, while an electro-magnetic clutch plate 31b, which faces the plate 31a, is made integral with a brake disk plate 33 and a worm-gear 34 by an axle 32. The axles 30 and 32 are installed to the main body (not shown in the drawing) by a bearing (not shown in the drawing). The worm gear 34 engages with a gear 35 which is integral with an axle 36, and the axle 36 is installed rotatably to the main body (not shown in the drawing). A pin 37 is fixed on the upper surface of the gear 35 while a pin 38 is fixed on the lower surface of the same. A release lever 39 which moves on the gear 35 has its position biased to the left-hand side by a spring 42 provided between a pin 40 fixed to the main body (not shown in the drawing) and a pin 41 on the release lever 39. 43 is a release arm installed rotatably to a pin 44 which is fixed on the main body (not shown in the drawing), and 45 is a shutter release button at a camera side. 49 is a release check lever and is rotatably installed in place by a pin 46 which is fixed to the main body (not shown in the drawing), and has its position restricted by a spring 48. A brake lever 52 is installed in place by a pin 53 which is fixed to the main body (not shown in the drawing) and is rotated in counter-clockwise direction until the left-hand end 52a of the brake lever strikes the main body (not shown in the drawing). A brake arm 50 is rotatably installed on the brake lever 52 by a pin 51 which is fixed on the brake lever 52, and is rotated to counter-clockwise direction by a spring 60 until it strikes the main body (not shown in the drawing). A locking lever 55 is rotatably installed in place by a pin 56 which is fixed to the main body (not shown in the drawing), and has its position restricted at a pin 58 by a spring 57. A pin 59 is provided on a gear 26. The gear 26 is so adjusted that it makes one rotation by one wind-up by making the reduction ratio of the gears 16, 17, 22, 3, 26, 27 suitable. P is an electro-magnet for releasing the release. $S_3$ has its $a$ in an open state and $b$ in a closed state under normal condition. $S_3'$ and $S_4$ are in an open state under normal condition. Each part mentioned above is about in the state shown in FIG. 3 at the time when wind-up of the camera is completed, wherein the motor M is stopped and electric current is not flowing to clutch coils $CL_1$, $CL_2$ and an electro-magnet P.

In FIG. 3 the brake arm 50 and the pin 38 are drawn in a partially separated manner for the convenience of explanation.

Next the functions of the mechanical part of the above mentioned second example will be explained.

a. When a release button which is not shown in the drawing is pressed, the motor M is started. As electric current flows to the coil $CL_1$ to couple the clutch 31a and the clutch 31b together and the gear 35 rotates in counter-clockwise direction, the pin 37 pushes the release lever 39 to the right-hand side, and the shutter release button 45 is pressed through the pin 41 and the arm 43; thus the shutter is released. A notched part 39a of the release lever engages with the check lever 49 which is pulled by the spring 48 and is locked.

b. The gear 35 continues rotation and as the pin 38 pushes one end 52c of the brake lever, the brake lever 52 is rotated in clockwise direction against the spring 54, and its one end 52b engages with the locking lever 55.

c. The pin 37 places the switch $S_3'$ momentarily in an open state to shut off the flowing of electric current to the clutch coil $CL_1$, releasing the clutches 31a, 31b, while the gear 35 rotates by inertia and the pin 36 pushes one end 50a of the brake arm. The 50b engages with a projected part 33a of the brake disk, and the rotation of the gear 35 stops. But the motor M is still being rotated.

d. After an elapse of such prescribed period of time as determined in correspondence to the shutter speed, current flows to the electro-magnet P, attracting the check lever 49, and releasing the release lever 39. As the shutter release button 45 returns to its original position, the release function is completed.

e. As the clutch coil $CL_2$ becomes energized, the clutches 20a, 20b are coupled together and the wind-up action is started. The deadweight 10 is then pushed outwardly by centrifugal force, accordingly $S_4$ closes and the gear 26 rotates through a series of gears, pin 59 as a result pushes one end 55a of the locking lever and the locking lever 55 is rotated in clockwise direction against the spring 57. The brake lever 52 is then released, and the brake lever 52 is rotated to counter-clockwise direction by the spring 54, while the engagement between the brake arm 50b and the brake plate 33a is released.

f. When the rotating speed of the gear 1 is reduced by completion of the wind-up, the centrifugal force working on the deadweight 10 is reduced, and as the spring power of the movable contacting piece 13 of the switch $S_4$ becomes larger, $S_4$ opens, shutting off the supply of electric current to the clutch coil $CL_2$, releasing the clutches 20a, 20b. At this time, as load is given to the wind-up coupler 4 and the gear 3 is stopped, the gear 2 starts revolving in a counter-clockwise direction around the axle 6 against the compression spring 9. Therefore, the energy supplied by the motor M after load is given to the wind-up coupler 4 and until the motor M stops will be consumed by revolution of the gear 2, thus preventing the excessive load from working on the wind-up coupler.

g. By the above mentioned cycle, one frame photographing is done. When the switch $S_5$ which is to be described below, is placed with the arm connected to terminal C the motor M makes continuous rotation, and continuous photographing can be done as long as the release button is pressed.

h. In order to have the above mentioned mechanism coupled with the electric circuit, the switch $S_4$ is linked with the deadweight 10, and the switch $S_3$, is linked with the pin 37 while the switch $S_3$-a·b is linked with the lever 39.

Next explanation shall be made of the arrangement of the electric control circuit.

i. In the first step action of release, the switch $S_1$ (hereinafter S stands for switch) closes and consequently the motor M also becomes energized j. In the second step of release, $S_2$ closes and a plus pulse works on a diode $D_4$ (hereinafter D stands for diode) this in turn activates $SCR_2$. Clutch coil $CL_1$ thereby energizes and at the same time $SCR_5$ activates. Transistor $Tr_5$ thereby turns on the relay energizes, and release of the above mentioned (a) is retained by its contact $l_1$. At the same time or immediately after $S_3$ is switched from $a$ to $b$.

By rotation of the gear 35, the pin 37 places $S_3'$ in an open state momentarily, thus $CL_1$ becomes OFF as in (c).

k. After an elapse of such period of time $T_1$ seconds (photographing time) as determined by a resistance $RV_2$, the capacitor $C_2$, $UJT_2$ becomes on, driving $SCR_4$ ON by the plus pulse from its cathode. The electromagnet P energizes and retention of the release button is as in (d), thus completing the exposure. $S_3$ returns to contact $a$. While P becomes energized, by the electric charge of the capacitor C11, the state of P being energized is retained for a prescribed period of time.

1. With $S_3$ at position $a$, transistor $Tr_4$ turn ON, when $S_3$ is at $b$, the base potential is higher than the emitter potential and $Tr_4$ becomes OFF, and when $S_3$ remains at $b$, it is reversed by the electric charge of $C_4$ placing $Tr_4$ ON. The electric charge of $C_4$ is discharged through $R_{22}$. A plus pulse applied through $D_1$ turns $SCR_1$ ON. The wind-up action as in the above mentioned (e) is started by the clutch coil $CL_2$.

$S_4$ closes by the deadweight 10, and $Tr_5$, placed in parallel with $S_4$ detects the wind-up starting by $S_4$ closing and having its base and emitter short-circuited thus turning OFF. Therefore, $SCR_5$ which is in series also becomes OFF. By wind-up completion, $S_4$ opens $SCR_1$ becomes $CL_2$ becomes open and the wind-up mechanism is stopped.

m. When both $S_4$ and $Tr_5$ are OFF (at the time when wind-up is completed), $Tr_1$ performs the same function of $Tr_4$ as mentioned above, thus $SCR_3$ turns ON through $D_3$.

After an elapse of such period of time, $T_2$ seconds (photographing interval) as determined by $RV_1$ and $C_1$, the $UJT_1$ becomes ON, a plus pulse to $D_7$ turns $Tr_2$ ON. Thus $Tr_3$ turns ON a, plus pulse by why of $R_8$, $C_7$, $R_9$ turns $SCR_2$ and $SCR_5$ turns ON. Thus the state of the above mentioned (j) is resumed. If the release button is not kept pressed $CL_1$, P, $CL_2$ works in turn at the ratio of photographing time $T_1$ to photographing interval $T_2$, and continuous photographing will be done.

When the release button is released, $S_2$ and $S_1$ become open and as $S_4$ becomes OFF at the time when the wind-up is completed, relay L becomes unenergized thus the motor M is stopped and entire function is stopped.

n. One frame photographing:

With $S_5$ at S and after release wind-up is done, the pulse from $Tr_1$ does not reach $SCR_3$. The release button is then released, placing $S_1$, $S_2$ open and it will not function until it becomes ON again.

While in the above mentioned example the centrifugal force by rotation of the axle is employed as a means to detect speed, the rotating speed may be detected by using such method as having an axle with a permanent magnet run through the coil, or by directly counting the rotations of the axle.

Semi-conductor elements such as pressure sensitive diode, etc., may be used instead of the switch $S_4$ as a matter of course.

What is claimed is:

1. An automatic wind-up device for detecting completion of film wind-up in a camera, comprising:
    means for winding up film to a condition of completion;
    means for driving said wind-up means at controlled speeds;
    transmission means for coupling force supplied by said driving means to said film wind-up means;
    means for controlling said driving means;
    means for sensing the speed of said driving means for rendering said driving control means inactive, said control means being rendered inactive upon the sensing of a speed resulting from completion of wind-up action; and
    means responsive to the completion of wind-up action for releasing said transmission from supplying driving force to said wind-up means until said driving control means becomes inactive for preventing excessive load on said film wind-up means.

2. The device of claim 1, wherein said driving means includes an electrical motor and said control means includes a switch for coupling electrical energy to said motor, said speed sensing means being coupled to said switch.

3. The device of claim 1, wherein said means for sensing speed of said driving means includes a rotatable member having elements disposed thereon responsive to centrifugal force provided by the rotation of said member.

4. The device of claim 2, wherein said switch includes an arm operating as a bearing element adapted for rotational motion, and wherein said means for sensing the speed of said driving means includes a rotatable member having elements disposed thereon responsive to centrifugal force provided by the rotation of the rotatable member, said elements of said rotatable member adapted to bear against said bearing element of said switch for controlling a condition of said switch.

5. The device of claim 1, wherein said transmission means includes an intermediate gear between a driving gear and a load gear, said load gear becoming immobile upon completion of wind-up, and said means for releasing said transmission includes means for pivoting said intermediate gear about the axis of said load gear against a compressive force.

6. The device of claim 4, including a second switch for energizing said motor, said motor remaining energized by said first switch until the speed of said rotatable member is reduced, resulting in said centrifugal force elements applying sufficiently small bearing force to said switch element to allow opening of said switch and deenergizing of said motor.

* * * * *